March 7, 1967 G. SCHMIDT 3,308,034
FUEL ELEMENT FOR NUCLEAR REACTORS
Filed Aug. 14, 1964

INVENTOR
GERHARD SCHMIDT
BY
Burgess, Dinklage & Sprung
ATTORNEYS.

United States Patent Office 3,308,034
Patented Mar. 7, 1967

3,308,034
FUEL ELEMENT FOR NUCLEAR REACTORS
Gerhard Schmidt, Leopoldshafen, Germany, assignor to Gesellschaft Fuer Kernforschung m.b.H., Karlsruhe, Germany, a corporation of Germany
Filed Aug. 14, 1964, Ser. No. 389,810
Claims priority, application Germany, Aug. 17, 1963, K 50,550
3 Claims. (Cl. 176—78)

The invention relates to a fuel element, especially for fast nuclear reactors, having longitudinal fins directed at least towards the adjacent elements and at the same time serving as spacers.

As in fast nuclear reactors a large amount of heat has to be dissipated from a relatively small unit volume, therefore the cooling medium is usually pumped through the reactor at a high rate of velocity. Thus, on the one hand flow resistance in the reactor is to be kept at a minimum, but on the other hand, the fuel elements are supposed to be grouped close together and the reactor should contain as little neutron absorbing structural material as possible so as to keep the critical mass of the reactor at a minimum. Nevertheless, the fuel elements in a reactor have to be retained in such a way as to make it impossible for them to loosen from their fixed positions and to vibrate even at extremely high velocities of the coolant.

In most familiar designs the fuel elements are retained by lattices or grids attached to the inner wall of the reactor or to special guiding boxes. In other well-known designs helically wound strips of sheet metal are introduced into the spaces between the individual fuel elements to support the surrounding fuel elements at short intervals. However, this is not safe enough for supporting the fuel elements either. For this reason, in another familiar design they are supported by additional intermediate grids installed in the reactor at fixed intervals.

Particularly in fast reactors inserts in the coolant flow channels are not desirable, because high velocities are required for the cooling mediums in these channels and the spaces between the fuel elements are relatively small so as to contribute only a minimum critical mass. For this reason, it is attempted to use structural material for the support absorbing only a minimum amount of neutrons.

It is the aim of this invention to create a fuel element which at low coolant resistance is stable enough to be unable to start vibrating over its entire length even at high cooling gas velocities. At the same time, the support shall be axially movable within certain limits towards its adjacent elements to equalize thermal stresses.

According to the invention, the fuel elements, are disposed with their axes parallel to each other, each having a plurality of circumferentially spaced axially directed fins projecting radially outwardly therefrom. The fins of adjacent elements are in abutting relation spacing the adjacent elements from each other, and the abutting fins have inter-engaging hooks securing the corresponding elements against radial displacement with respect to each other. Desirably, the fins include means for preventing relative rotational movement of the fuel elements. Such means can comprise flush meeting bevel surfaces of abutting fins, oppositely offset along the length of the fins.

Details of the invention are described more closely on the basis of the drawings.

Figure 1:
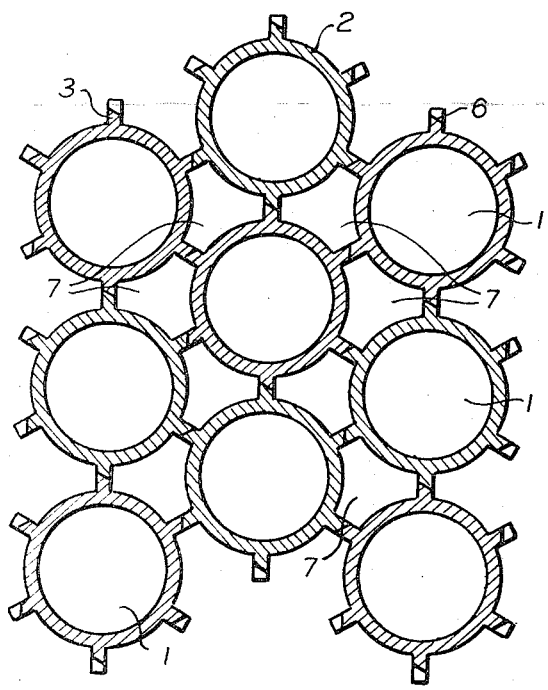
FIG. 1 shows a section through an assembly of fuel elements of a fast reactor wherein the fuel elements are in a triangular grouping.

Referring to the drawings, the arrangement according to the invention provides a plurality of fuel elements 1 disposed in the cans 2. The elements are disposed with their axes in parallel relation, and a plurality of circumferentially spaced, axially directed fins 3 project radially outwardly from each of the cans 2. Each of the cans is provided with six such fins, and the fins of adjacent elements are in abutting relation, and serve to space the adjacent elements from each other. In the triangular arrangement for the elements illustrated in the drawing, each element is surrounded by six other elements, and has one fin 3 in abutting engagement with a fin of each of six surrounding elements.

Figure 3:
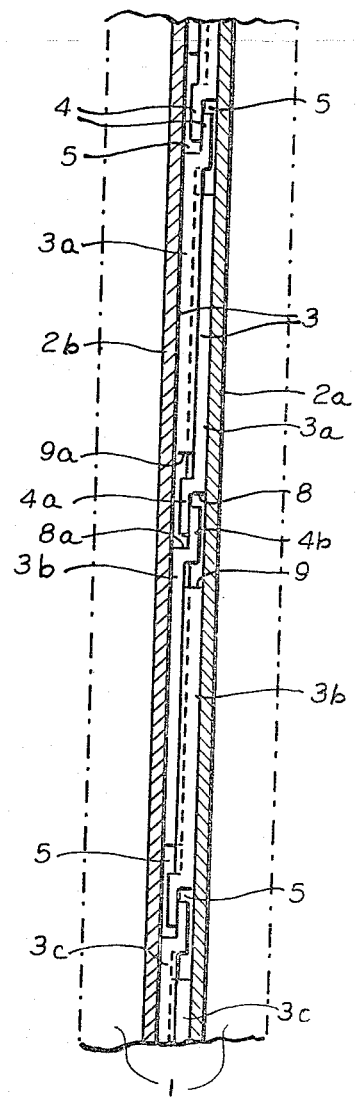
FIG. 3 shows a longitudinal section through two fuel elements linked with each other.

Each of the fins 3 has spaced cut-outs 5 along its length and these spaced cut-outs divide the fins into a plurality of fin sections 3a, 3b, and 3c. Referring particularly to FIG. 3, the fin sections have opposed spaced ends. Thus, the sections 3a and 3b have opposed spaced ends 8 and 9. A hook is joined to one of the ends of the fin sections defining each cut-out, the hook opening in an axial direction and being aligned with its fin section. Thus, the hook 4a is joined to the end 8 of fin section 3a of can 2a, and the hook 4b is joined to end 8a of the fin section 3b of the fin 2b.

The hooks of abutting fin sections are inter-engaged with each other providing engaged pairs of hooks, such as the engaged pair 4a, 4b. The hooks secure the elements 1 against radially directed movement, and are dimensioned so that close fitting inter-engagement is obtained providing additional contact between the fins of adjacent elements. One hook of each engaged hook opens in one axial direction and the other hook of such pair opens in the other axial direction. Thus, the hook 4b opens in the upward axial direction, while the hook 4a opens in the downward axial direction.

The spacing of the opposed spaced ends of the fin sections permits engagement and disengagement of the hook pairs by, respectively, relative radial movement of adjacent elements toward each other followed by relative axial movement thereof, and relative axial movement followed by relative radial movement away from each other. Thus, referring to FIG. 2, wherein portions of the cans 2 are shown with the cans in spaced relation prior to assembly, the can 2a can be moved radially in the direction of the arrow 10 and then downwardly in the direction of the arrow 11 to provide the hooks 4 in engagement, as is shown in FIG. 3.

Figure 2:
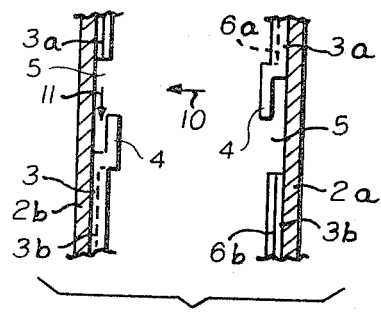
FIG. 2 shows the hooks at the fins of the fuel elements.

According to the invention, the fins can include means for preventing relative rotational movement of the fuel elements. Desirably, said means comprises flush meeting bevel surfaces of abutting fins, oppositely offset along the length of the fins. As can be seen in FIG. 1, the fins of adjacent elements meet in flush, abutting relation, and the abutting surfaces are bevelled. As can be best seen in FIG. 2, the bevel surfaces are oppositely offset along the length of the fins. The bevel surfaces are indicated by the reference numeral 6 (FIG. 1). As is shown in FIG. 2, for the can 2a, the bevel surface 6a of fin section 3a is oppoistely offset with respect to the bevel surface 6b of fin section 3b. A corresponding bevel offset relation is provided for the fin sections of the can 2b. The oppositely offset bevel arrangement serves to secure the elements against rotation in either direction.

As can be seen in FIG. 1, the arrangement there shown provides channels 7 for coolant, and these channels are entirely free from structure as would cause a change in cross-section of the channels.

To facilitate assembly of the fuel element cluster the hooks of three adjacent fins of a fuel element must have the same direction, e.g. face the bottom, whereas the hook of the rest of the fins can face, and preferably do face in the opposite direction.

The fuel element clusters formed by joining the fins of fuel elements according to the invention may be installed in guiding boxes supporting the fuel element clusters in the reactor and permitting easy introduction and withdrawal of the clusters into and out of the reactor. However, it is possible also to join all fuel elements together without installing guide boxes in the reactor and in that case the fuel element cluster is supported by the wall of the reactor. It is of course possible to employ other fuel element arrangements besides fuel elements having six fins, i.e. fuel element clusters of a triangular grouping, and for other arrangements the number of cooling fins should correspond at least to the number of adjacent elements. Preferably, the fins are beveled in order to prevent rotary movement, they may also feature steps or tongue and groove connections or similar mating surfaces.

While the invention has been described with respect to particular embodiments thereof, it will be appreciated that these embodiments are merely representative and do not serve to set forth the limits of the invention.

What is claimed is:

1. A plurality of elongated fuel elements in assembled relation,
    (a) said elements being disposed with their axes parallel to each other,
    (b) a plurality of circumferentially spaced axially directed fins projecting radially outwardly from each element,
    (c) the fins of adjacent elements being in abutting relation spacing said adjacent elements from each other, and having flush meeting bevel surfaces oppositely offset along the length of abutting fins preventing rotational movement of the elements,
    (d) abutting fins having inter-engaging hooks securing the corresponding elements against radial displacement with respect to each other.

2. A plurality of elongated fuel elements in assembled relation,
    (a) said elements being disposed with their axes parallel to each other,
    (b) a plurality of circumferentially spaced axially directed fins projecting radially outwardly from each element,
    (c) the fins of adjacent elements being in abutting relation spacing said adjacent elements from each other, and having flush meeting bevel surfaces oppositely offset along the length of abutting fins preventing rotational movement of the elements,
    (d) a hook joined to each fin aligned therewith,
    (e) the hooks of abutting fins being in interengagement forming hook pairs each hook pair comprising a hook joined to one of abutting fins and a hook joined to the other of abutting fins, one of the hooks of each pair opening axially upwardly, the other opening axially downwardly.

3. A plurality of elongated fuel elements in assembled relation,
    (a) said elements being disposed with their axes parallel to each other,
    (b) a plurality of circumferentially spaced axially directed fins projecting radially outwardly from each element,
    (c) the fins of adjacent elements being in abutting relation spacing said adjacent elements from each other, and having flush meeting bevel surfaces oppositely offset along the length of abutting fins preventing rotational movement of the elements,
    (d) each fin having spaced cut-outs along its length dividing it into a plurality of fin sections having opposed spaced ends,
    (e) a hook joined to one of the ends of the fin sections defining each cut out, said hook opening in an axial direction,
    (f) the hooks of abutting fin sections being interengaged with each other providing engaged pairs of hooks and securing said elements against radially directed movement,
    (g) one hook of each engaged pair opening in one axial direction and the other hook of each pair opening in the other axial direction,
    (h) the spacing of opposed spaced ends permitting engagement and disengagement of the hook pairs by, respectively, relative radial movement of adjacent elements toward each other followed by relative axial movement thereof, and relative axial movement followed by relative radial movement away from each other.

References Cited by the Examiner

UNITED STATES PATENTS 2,898,280  8/1959  Schultz _____ 176—78
3,072,552  1/1963  Fortescue et al. _____ 176—78

CARL D. QUARFORTH, *Primary Examiner.*

BENJAMIN R. PADGETT, L. DEWAYNE RUTLEDGE, *Examiners.*

M. J. SCOLNICK, *Assistant Examiner.*